United States Patent
Yuan et al.

(10) Patent No.: US 11,972,116 B2
(45) Date of Patent: Apr. 30, 2024

(54) PROCESS MONITORING METHOD AND APPARATUS

(71) Applicant: HUAWEI TECHNOLOGIES CO., LTD., Guangdong (CN)

(72) Inventors: Jinfeng Yuan, Beijing (CN); Shengqiang Huang, Vancouver (CA); Yongcun Gan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 265 days.

(21) Appl. No.: 16/831,123

(22) Filed: Mar. 26, 2020

(65) Prior Publication Data

US 2020/0225855 A1 Jul. 16, 2020

Related U.S. Application Data

(63) Continuation of application No. PCT/CN2018/102476, filed on Aug. 27, 2018.

(30) Foreign Application Priority Data

Sep. 28, 2017 (CN) .......................... 201710897225.5

(51) Int. Cl.
*H04L 29/06* (2006.01)
*G06F 3/06* (2006.01)
(Continued)

(52) U.S. Cl.
CPC .......... *G06F 3/0622* (2013.01); *G06F 3/0637* (2013.01); *G06F 3/0659* (2013.01);
(Continued)

(58) Field of Classification Search
CPC .... G06F 3/0622; G06F 3/0637; G06F 3/0659; G06F 3/0673; G06F 21/52; G06F 21/53; G06F 2221/033
See application file for complete search history.

(56) References Cited

U.S. PATENT DOCUMENTS

| | | |
|---|---|---|
| 2011/0082962 A1 | 4/2011 | Horovitz et al. |
| 2015/0301917 A1 | 10/2015 | Cui et al. |
| (Continued) | | |

FOREIGN PATENT DOCUMENTS

| | | |
|---|---|---|
| CN | 102567217 A | 7/2012 |
| CN | 102609254 A | 7/2012 |
| (Continued) | | |

OTHER PUBLICATIONS

XP035939126 Andrei Lu a et al., "U-HIPE: hypervisor-based protection of user-mode processes in Windows",J Comput Virol Hack Tech (2016) ,pp. 23-36.
(Continued)

*Primary Examiner* — Evans Desrosiers
(74) *Attorney, Agent, or Firm* — Leydig, Voit & Mayer, Ltd.

(57) ABSTRACT

A processing unit determines a first mapping relationship and a second mapping relationship, where the first mapping relationship indicates that an access rule of a first physical address is access forbidden, and the second mapping relationship indicates that an access rule of the first physical address is access allowed. The processing unit determines that a target mapping relationship is the first mapping relationship, sends a first access request to a memory control unit. The processing unit receives first exception information sent by the memory control unit, where the first exception information is sent when the memory control unit determines that the access rule of the first physical address in the target mapping relationship is access forbidden. The processing unit monitors a process based on the first exception information, switches the target mapping relationship; and re-sends the first access request to the memory control unit.

13 Claims, 9 Drawing Sheets

(51) Int. Cl.
*G06F 21/52* (2013.01)
*G06F 21/53* (2013.01)

(52) U.S. Cl.
CPC ............ *G06F 3/0673* (2013.01); *G06F 21/52* (2013.01); *G06F 21/53* (2013.01); *G06F 2221/033* (2013.01)

(56) References Cited

U.S. PATENT DOCUMENTS

2018/0060574 A1* 3/2018 White ................. G06F 21/53
2018/0165133 A1* 6/2018 Iyigun ................ H04L 65/40

FOREIGN PATENT DOCUMENTS

| CN | 102736969 A | 10/2012 |
| CN | 103365702 A | 10/2013 |
| CN | 103744851 A | 4/2014 |
| CN | 103914363 A | 7/2014 |
| WO | 2016082763 A1 | 6/2016 |

OTHER PUBLICATIONS

Vyacheslav Rusakov et al., "A Modern Hypervisor as a Basis for a Sandbox", SECURELIST by Kaspersky, Sep. 19, 2017,https://securelist.com/a-modern-hypervisor-as-a-basis-for-a-sandbox/81902/, Total 21 Pages.
XP035939126 Andrei Lutas et al.,"U-HIPE: hypervisor-based protection of user-mode processes in Windows",J Comput Virol Hack Tech (2016) ,pp.23-36.

* cited by examiner

PROCESS MONITORING METHOD AND APPARATUS

CROSS-REFERENCE TO RELATED APPLICATIONS

This application is a continuation of International Application No. PCT/CN2018/102476, filed on Aug. 27, 2018, which claims priority to Chinese Patent Application No. 201710897225.5, filed on Sep. 28, 2017. The disclosures of the aforementioned applications are hereby incorporated by reference in their entireties.

TECHNICAL FIELD

This application relates to the computer field, and more specifically, to a process monitoring method and an apparatus.

BACKGROUND

With development of computer technologies, security of a computer becomes a focus to which people pay attention. Monitoring a behavior that a process invokes an external function is a feasible means to improve computer security.

Currently, in an existing technology, the behavior that a process invokes an external function is monitored according to the following principle: Program monitoring code is written into a sample program, a process that needs to be monitored is generated after the sample program runs, and then a control point invoking code is added to the external function. When the external function is invoked, a control flow redirects to the program monitoring code, to monitor and record a behavior of the monitored process.

However, in this technology, the sample program and the external function need to be modified (to be specific, code for triggering monitoring is added) in advance. This increases monitoring costs, and may affect normal running of the process and the external function.

Therefore, it is desired to provide a technology, so that the behavior that a process invokes an external function can be monitored without modifying code of the sample program and code of the external function.

SUMMARY

This application provides a process monitoring method and an apparatus, to monitor a process without a need to modify code of a sample program or code of an external function.

According to a first aspect, a process monitoring method is provided. The method is performed by a computing device, the computing device includes a processing unit, a memory, and a memory control unit, and the method includes: determining, by the processing unit, a first mapping relationship and a second mapping relationship, where the first mapping relationship and the second mapping relationship indicate a mapping relationship between a first virtual address and a first physical address, and an access rule of the first physical address, the first mapping relationship indicates that the access rule of the first physical address is access forbidden, the second mapping relationship indicates that the access rule of the first physical address is access allowed, the first physical address is a physical address of first memory space in the memory, the first memory space is memory space other than second memory space in the memory, and the second memory space is memory space used to store program code for generating a first process; when the first process starts to run, determining, by the processing unit, that a target mapping relationship is the first mapping relationship, where the target mapping relationship is a mapping relationship used when the memory control unit controls access to the memory; when the first process needs to access the first memory space, sending, by the processing unit, a first access request to the memory control unit, where the first access request carries the first virtual address; receiving, by the processing unit, first exception information sent by the memory control unit, where the first exception information is sent when the memory control unit determines that the access rule of the first physical address in the target mapping relationship is access forbidden; performing, by the processing unit, first monitoring processing on the first process based on the first exception information, and performing first switching processing on the target mapping relationship, where the first switching processing is used to switch the target mapping relationship from the first mapping relationship to the second mapping relationship; and re-sending, by the processing unit, the first access request to the memory control unit.

According to the process monitoring method in this embodiment of this application, the processing unit may configure the first mapping relationship and the second mapping relationship, the first mapping relationship and the second mapping relationship indicate a same mapping relationship between a virtual address and a physical address, and the first mapping relationship and the second mapping relationship indicate different access rules of the physical address. When the first process starts to run, the processing unit sets the first mapping relationship in which an access rule is access forbidden as the target mapping relationship used when the memory control unit controls access to the memory. Therefore, when code of the first process indicates that memory space corresponding to the first physical address needs to be accessed, the memory control unit reports page exception information to the processing unit because the target mapping relationship (the first mapping relationship) indicates that the access rule of the first physical address is access forbidden. Further, the processing unit can trigger monitoring on the first process based on the page exception information, switch the target mapping relationship from the first mapping relationship to the second mapping relationship, and re-send the access request. Because the switched-to target mapping relationship (the second mapping relationship) indicates that the access rule of the first physical address is access allowed, the memory control unit can allow the memory space corresponding to the first physical address to be accessed. The first mapping relationship and the second mapping relationship are configured, and the target mapping relationship is switched based on a page exception, so that a process can be monitored on an appropriate occasion. In addition, in the foregoing method, no additional monitoring code needs to be added to a sample program or an external function, thereby improving efficiency of monitoring the process without affecting access of the process to the memory.

Optionally, the first virtual address is a guest physical address GPA, and the first physical address is a host physical address HPA.

Optionally, the first mapping relationship and the second mapping relationship are an extended page table EPT.

Therefore, the process monitoring method in this embodiment of this application can be compatible with the prior art, to further improve implementation practicality of this application.

Optionally, the first mapping relationship and the second mapping relationship further indicate a mapping relationship between a second virtual address and a second physical address, and an access rule of the second physical address, the first mapping relationship indicates that the access rule of the second physical address is access allowed, the second mapping relationship indicates that the access rule of the second physical address is access forbidden, and the second physical address is a physical address of the second memory space; and after the performing first switching processing on the target mapping relationship, the method further includes: when code stored in the first memory space indicates that the second memory space needs to be accessed, sending, by the processing unit, a second access request to the memory control unit, where the second access request carries the second virtual address; receiving, by the processing unit, second exception information sent by the memory control unit, where the second exception information is sent when the memory control unit determines that the access rule of the second physical address in the target mapping relationship is access forbidden; performing, by the processing unit, second monitoring processing on the first process based on the second exception information, and performing second switching processing on the target mapping relationship, where the second switching processing is used to switch the target mapping relationship from the second mapping relationship to the first mapping relationship; and re-sending, by the processing unit, the second access request to the memory control unit.

According to the process monitoring method in this embodiment of this application, when the process invokes the external function, the processing unit sets the second mapping relationship in which an access rule is access forbidden as the target mapping relationship used when the memory control unit controls access to the memory. Therefore, when the external function needs to perform returning for the process, the memory control unit reports page exception information to the processing unit because the target mapping relationship (the second mapping relationship) indicates that the access rule of the second physical address is access forbidden. The processing unit can trigger monitoring on the process based on the page exception information, switch the target mapping relationship from the second mapping relationship to the first mapping relationship, and re-send the access request. Because the switched-to target mapping relationship (the first mapping relationship) indicates that the access rule of the second physical address is access allowed, the memory control unit can allow memory space corresponding to the second physical address to be accessed. Returning for invoking can be monitored without affecting access of the process to the memory, and monitoring occasions increase while a behavior that the process invokes the external function is monitored.

Optionally, the second virtual address is a guest physical address GPA, and the second physical address is a host physical address HPA.

Optionally, the determining, by the processing unit, a first mapping relationship and a second mapping relationship includes: when the first process is created, determining, by the processing unit, a second process, where the second process is a parent process of the first process; and when the second process needs to be monitored, determining, by the processing unit, access rules of the second physical address in the first mapping relationship and the second mapping relationship.

According to the process monitoring method in this embodiment of this application, access rules of a child process recorded in the first mapping relationship and the second mapping relationship are determined depending on whether a parent process needs to be monitored, to easily determine the access rules and further improve implementation practicality of this application.

Optionally, the method further includes: when the first process ends, deleting, by the processing unit, the first mapping relationship and the second mapping relationship. Therefore, storage space can be saved.

Optionally, the first memory space is used to store code of the external function, the external function includes a function other than a process function, and the process function is a function included in the program code for generating the first process.

Optionally, the code of the external function includes at least one of process shared code or system kernel code.

In addition, the code of the external function is stored in the storage space corresponding to the first physical address, and according to the process monitoring method and an apparatus in this embodiment of this application, the behavior that the process invokes the external function can be monitored without modifying code of the process and the code of the external function.

According to a second aspect, a process monitoring method is provided. The method is performed by a computing device, the computing device includes a processing unit, a memory, and a memory control unit, and the method includes: receiving, by the memory control unit, a first access request sent by the processing unit, where the first access request carries a first virtual address, the first access request is sent by the processing unit when a first process needs to access first memory space in the memory, the first memory space is memory space other than second memory space in the memory, and the second memory space is memory space used to store program code for generating a first process; sending, by the memory control unit, first exception information to the processing unit when determining that an access rule of a first physical address in a currently used target mapping relationship is access forbidden, so that the processing unit performs first monitoring processing on the first process based on the first exception information, where the target mapping relationship is determined by the processing unit as a first mapping relationship when the first process starts to run, the first mapping relationship indicates a mapping relationship between the first virtual address and the first physical address, and an access rule of the first physical address, the first mapping relationship indicates that the access rule of the first physical address is access forbidden, and the first physical address is a physical address of the first memory space; receiving, by the memory control unit, a first access request that is re-sent by the processing unit based on the first exception information; controlling, by the memory control unit based on the target mapping relationship and the first access request re-sent by the processing unit, access to the first memory space, where the target mapping relationship is switched by the processing unit to a second mapping relationship before the memory control unit receives the re-sent first access request, the second mapping relationship indicates a mapping relationship between the first virtual address and the first physical address, and an access rule of the first physical address, and the second mapping relationship indicates that the access rule of the first physical address is access allowed.

According to the process monitoring method in this embodiment of this application, the first mapping relationship and the second mapping relationship are configured, and the target mapping relationship is switched based on a page exception, so that a process can be monitored on an appropriate occasion. In addition, in the foregoing method, no additional monitoring code needs to be added to a sample program or an external function, thereby improving efficiency of monitoring the process without affecting access of the process to the memory.

Optionally, the first virtual address is a guest physical address GPA, and the first physical address is a host physical address HPA.

Optionally, the first mapping relationship and the second mapping relationship are an extended page table EPT.

Therefore, the process monitoring method in this embodiment of this application can be compatible with the prior art, to further improve implementation practicality of this application.

Optionally, the first mapping relationship and the second mapping relationship further indicate a mapping relationship between a second virtual address and a second physical address, and an access rule of the second physical address, the first mapping relationship indicates that the access rule of the second physical address is access allowed, the second mapping relationship indicates that the access rule of the second physical address is access forbidden, and the second physical address is a physical address of the second memory space; and after the controlling, by the memory control unit based on the target mapping relationship and the first access request re-sent by the processing unit, access to the first memory space, the method further includes: receiving, by the memory control unit, a second access request sent by the processing unit, where the second access request carries the second virtual address; sending, by the memory control unit, second exception information to the processing unit when determining that the access rule of the second physical address in the currently used target mapping relationship is access forbidden; receiving, by the memory control unit, the second access request that is re-sent by the processing unit based on the second exception information; and controlling, by the memory control unit based on the target mapping relationship and the second access request, access to the second memory space, where the target mapping relationship is switched by the processing unit to the first mapping relationship before the memory control unit receives the re-sent second access request.

According to the process monitoring method in this embodiment of this application, when the process invokes the external function, the processing unit sets the second mapping relationship in which an access rule is access forbidden as the target mapping relationship used when the memory control unit controls access to the memory. Therefore, when the external function needs to perform returning for the process, the memory control unit reports page exception information to the processing unit because the target mapping relationship (the second mapping relationship) indicates that the access rule of the second physical address is access forbidden. The processing unit can trigger monitoring on the process based on the page exception information, switch the target mapping relationship from the second mapping relationship to the first mapping relationship, and re-send the access request. Because the switched-to target mapping relationship (the first mapping relationship) indicates that the access rule of the second physical address is access allowed, the memory control unit can allow memory space corresponding to the second physical address to be accessed. Returning for invoking can be monitored without affecting access of the process to the memory, and monitoring occasions increase while a behavior that the process invokes the external function is monitored.

Optionally, the second virtual address is a guest physical address GPA, and the second physical address is a host physical address HPA.

Optionally, access rules of the second physical address in the first mapping relationship and the second mapping relationship are determined when a second process needs to be monitored, and the second process is a parent process of the first process.

According to the process monitoring method in this embodiment of this application, access rules of a child process recorded in the first mapping relationship and the second mapping relationship are determined depending on whether a parent process needs to be monitored, to easily determine the access rules and further improve implementation practicality of this application.

Optionally, the first memory space is used to store code of the external function, the external function includes a function other than a process function, and the process function is a function included in the program code for generating the first process.

Optionally, the code of the external function includes at least one of process shared code or system kernel code.

In addition, the code of the external function is stored in the storage space corresponding to the first physical address, and according to the process monitoring method and an apparatus in this embodiment of this application, the behavior that the process invokes the external function can be monitored without modifying code of the process and the code of the external function.

According to a third aspect, a chip is provided, including at least one processing unit and at least one memory control unit, where the processing unit performs the method in any one of the first aspect or the possible implementations of the first aspect, and the memory control unit performs the method in any one of the second aspect or the possible implementations of the second aspect.

According to a fourth aspect, a computer system is provided, including a processor and a memory, where the processor includes at least one processing unit and a memory control unit, the processing unit performs the method in any one of the first aspect or the possible implementations of the first aspect, and the memory control unit performs the method in any one of the second aspect or the possible implementations of the second aspect.

Optionally, the computer system further includes a system bus, and the system bus is configured to connect the processor (specifically, the memory control unit) and the memory.

According to a fifth aspect, a computer program product is provided. The computer program product includes a computer program (which may also be referred to as code or an instruction), and when the computer program is run by a processing unit in a processor or in a chip, the processing unit is enabled to perform the method in any one of the first aspect or the possible implementations of the first aspect.

According to a sixth aspect, a computer program product is provided. The computer program product includes a computer program (which may also be referred to as code or an instruction), and when the computer program is run by a memory control unit in a processor or in a chip, the memory control unit is enabled to perform the method in any one of the second aspect or the possible implementations of the second aspect.

According to a seventh aspect, a computer readable medium is provided. The computer readable medium stores a computer program (which may also be referred to as code or an instruction), and when the computer program is run by a processing unit in a processor or in a chip, the processing unit is enabled to perform the method in any one of the first aspect or the possible implementations of the first aspect.

According to an eighth aspect, a computer readable medium is provided. The computer readable medium stores a computer program (which may also be referred to as code or an instruction), and when the computer program is run by a memory control unit in a processor or in a chip, the memory control unit is enabled to perform the method in any one of the second aspect or the possible implementations of the second aspect.

DESCRIPTION OF EMBODIMENTS

The following describes the technical solutions of this application with reference to the accompanying drawings.

First, a computing device 100 to which a process monitoring method in the embodiments of this application is applicable is described in detail with reference to FIG. 1.

The computing device may also be referred to as a computer system, and may include a hardware layer, an operating system layer that runs above the hardware layer, and an application layer that runs above the operating system layer. The hardware layer includes hardware such as a processing unit, a memory, and a memory control unit. Subsequently, functions and structures of the hardware are described in detail. An operating system may be any one or more computer operating systems that implement service processing by using a process (Process), such as a Linux operating system, a Unix operating system, an Android operating system, an iOS operating system, or a Windows operating system. The application layer includes application programs such as a browser, an address book, word processing software, and instant messaging software. In addition, in the embodiments of this application, the computer system may be a handheld device such as a smartphone, or may be a terminal device such as a personal computer. This is not particularly limited in this application, provided that the computer system can run a program recording code of the process monitoring method in the embodiments of this application, to monitor a process according to the process monitoring method in the embodiments of this application. The process monitoring method in the embodiments of this application may be performed by the computer system, or may be performed by a function module that can invoke and execute a program in the computer system.

In this application, the program is a group of ordered instructions (or code) used to implement a relatively independent function. The process is a process in which a program and data of the program run on a computer device. The program is usually designed through modularization, to be specific, a function of the program is detailed and decomposed into a plurality of smaller function modules. The program includes at least one function, and the function is a code segment for implementing one function module. Therefore, the function is a basic unit of function modularization of the program, and may also be considered as a child program.

Figure 1:
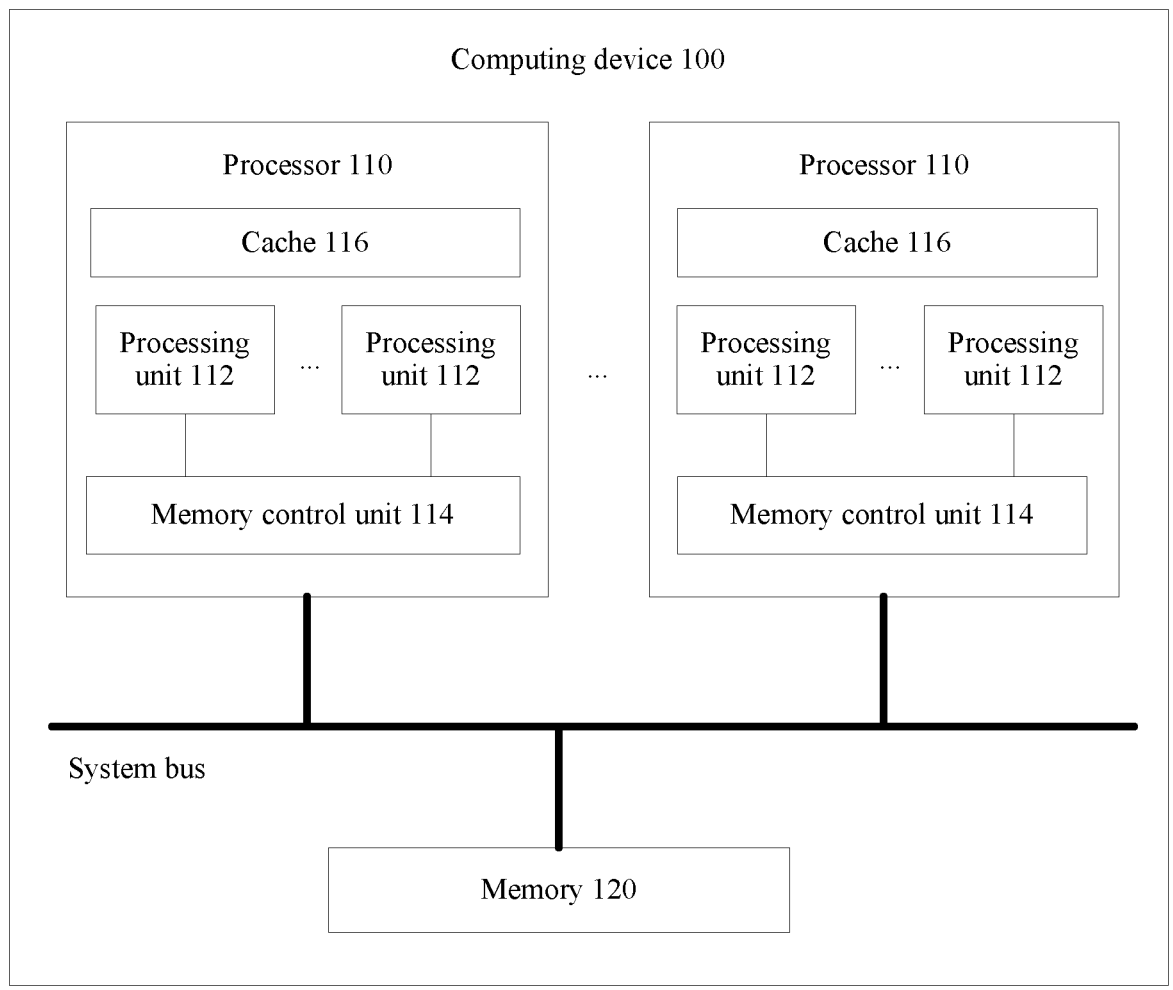
FIG. 1 is a schematic diagram of a hardware structure of a computer device (or a computer system) to which a process monitoring method and an apparatus in an embodiment of this application are applicable.

FIG. 1 is a schematic architectural diagram of a computing device 100 according to an embodiment of this application. The computing device shown in FIG. 1 is configured to perform a process monitoring method. The computing device 100 may include at least one processor 110 and a memory 120.

Optionally, the computing device 100 may further include a system bus, and the processor 110 and the memory 120 each are connected to the system bus. The processor 110 can access the memory 120 by using the system bus. For example, the processor 110 can read and write data or execute code in the memory 120 by using the system bus.

A function of the processor 110 is mainly to interpret an instruction (or code) of a computer program and process data in computer software. The instruction of the computer program and the data in the computer software may be saved in the memory 120 or a cache unit 116.

In the embodiments of this application, the processor 110 may be an integrated circuit chip, and has a signal processing capability. As an example instead of a limitation, the processor 110 may be a general purpose processor, a digital signal processor (DSP), an application-specific integrated circuit (ASIC), a field programmable gate array (FPGA) or another programmable logic device, a discrete gate or transistor logic device, or a discrete hardware component. The general purpose processor may be a microprocessor or the like. For example, the processor 110 may be a central processing unit (CPU).

Each processor 110 includes at least one processing unit 112 and a memory control unit 114.

The processing unit 112 may also be referred to as a core (Core) or a kernel, and is a most important component of the processor. The processing unit 112 may be made from monocrystalline silicon by using a specific production process, and all calculation, acceptance commands, storage commands, and data processing of the processor are executed by the core. The processing unit may independently run a program instruction, and accelerate a running speed of a program by using a parallel computing capability. Various processing units are in a fixed logical structure. For example, the processing unit may include logical units such as a level-1 cache, a level-2 cache, an execution unit, an instruction-level unit, and a bus interface.

The memory control unit 114 is configured to control data exchange between the memory 120 and the processing unit 112. Specifically, the memory control unit 114 may receive a memory access request from the processing unit 112, and control access to the memory based on the memory access request. As an example instead of a limitation, in the embodiments of this application, the memory control unit may be a component such as a memory management unit (MMU).

In the embodiments of this application, each memory control unit 114 may address the memory 120 by using the system bus. In addition, an arbiter (which is not shown in the figure) may be configured in the system bus, and the arbiter may be responsible for processing and coordinating contention access of a plurality of processing units 112.

In the embodiments of this application, the processing unit 112 may be communicatively connected to the memory control unit 114 by using a connection line such as an address line inside a chip, to implement communication between the processing unit 112 and the memory control unit 114.

Optionally, each processor 110 may further include the cache unit 116, and a cache is a data exchange buffer (referred to as a Cache). When the processing unit 112 needs to read data, the processing unit 112 first searches the cache for required data. If the data is found, the processing unit 112 directly reads the data; or if the data is not found, the processing unit 112 searches the memory for the data. Because the cache runs much faster than the memory, a function of the cache is to help the processing unit 112 run faster.

The memory (Memory) 120 may provide running space for a process in the computing device 100, for example, the memory 120 may store a computer program (specifically, code of the program) for generating the process. In addition, the memory 120 may store data generated during running of the process, for example, intermediate data or process data. The memory may also be referred to as an internal memory, and is configured to temporarily store operation data in the processor 110 and data exchanged with an external memory such as a hard disk. Provided that the computer runs, the processor 110 invokes data that needs to be operated to the memory for an operation, and the processing unit 112 sends a result after the operation is completed.

As an example instead of a limitation, in the embodiments of this application, the memory 120 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and the volatile memory is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory 120 of the systems and methods described in this specification includes but is not limited to these and any memory of another proper type.

It should be understood that a structure of the foregoing computing device 100 is merely an example for description, and this application is not limited thereto. The computing device 100 in the embodiments of this application may include various types of hardware in a computer system in the prior art. For example, the computing device 100 may further include a memory other than the memory 120, such as a magnetic disk memory.

In the embodiments of this application, a virtualization technology may be applied to the computing device 100. A plurality of virtual machines may simultaneously run on the computing device 100 by using the virtualization technology, at least one operating system may run on each virtual machine, and a plurality of programs run in each operating system.

The virtual machine (Virtual Machine) is a complete computer system that is simulated by using software, has functions of a complete hardware system, and runs in a totally isolated environment. A physically existing computer on which a virtual machine runs may be referred to as a host (Host). A physical address of a memory of the host may be referred to as a host physical address (HPA).

An operating system in which a virtual machine runs may be referred to as a guest (Guest). When a process on a guest runs, a guest virtual address (GVA) may be assigned to the process.

Figure 2:
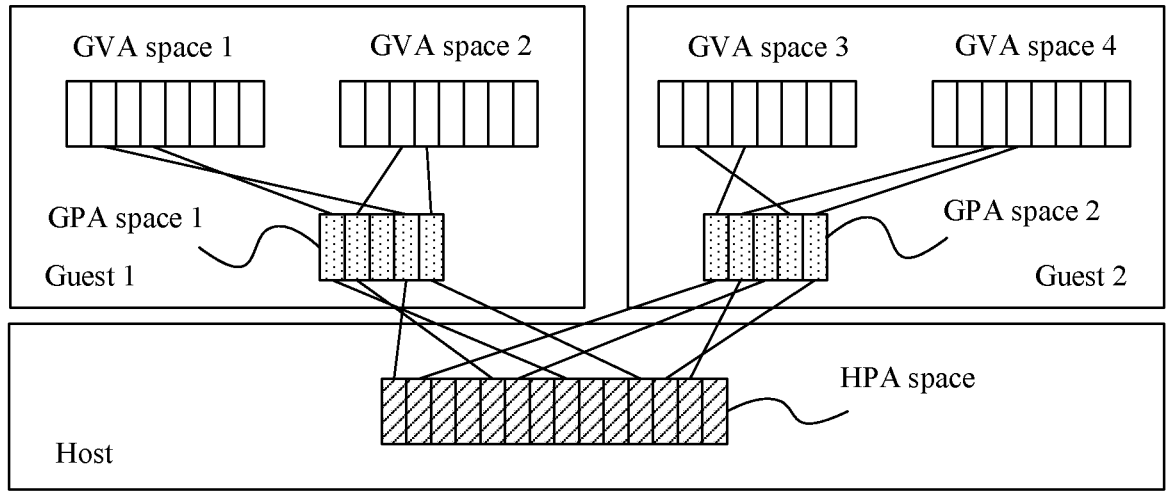
FIG. 2 is a schematic diagram of a virtualization logical architecture of a computer device to which an embodiment of this application is applicable.

As shown in FIG. 2, in the embodiments of this application, to enable a guest to use isolated and continuous memory space that starts from zero, a concept of a guest physical address (GPA) is introduced. This address space is not real physical address space. For the guest, guest physical address space is continuous address space that starts from zero. However, for the host, guest physical address space is not necessarily continuous, and the guest physical address space may be mapped to several discontinuous host physical address intervals. Therefore, a GVA is mapped to a GPA and then to an HPA, that is, address translation is performed, so that a process in the guest accesses the memory of the host.

Figure 3:
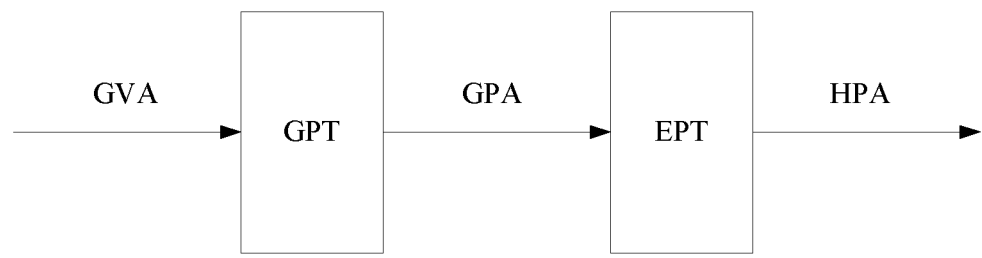
FIG. 3 is a schematic diagram of a memory addressing process based on a logical architecture shown in FIG. 2.

Optionally, FIG. 3 shows an implementation of the address translation. In the embodiments of this application, a guest page table (GPT) and an extended page table (EPT) are configured. A page table is a management mode of address space. For details, refer to descriptions in related documents. Details are not described herein. The GPT may be maintained by the guest, and the EPT may be maintained by virtualization software on the host, for example, a virtual machine monitor (VMM) that runs on the host. The VMM is also referred to as a hypervisor. A target process generated by a sample program runs on a virtual machine. A monitoring program runs outside the virtual machine (for example, on another virtual machine). The monitoring program is responsible for monitoring and recording a behavior of the sample program (or the target process) during execution.

For example, when a process (denoted as a process #X) in the virtual machine needs to access host physical address space (denoted as host physical space #X) in the memory of the host, and a virtual address (the virtual address corresponds to the host physical space #X) that is assigned by the virtual machine to the process #X is a GVA #X, the guest may determine, based on the GPT, a GPA (denoted as a GPA #X) corresponding to the GVA #X. Further, a memory control unit MMU of the host may determine, based on the EPT, an HPA (denoted as an HPA #X) corresponding to the GPA #X, to complete access to memory space corresponding to the HPA #X. The VMM in the host may record a behavior that the target process accesses the memory.

In the embodiments of the present disclosure, the EPT not only records a mapping relationship between a GPA and an HPA, but also records an access rule (or an access permission) of the HPA (specifically, memory space corresponding to the HPA).

As an example instead of a limitation, in the embodiments of this application, the access permission may include three types: read, write, and execution. Correspondingly, in the EPT, three fields may be set for the memory space indicated by the HPA, to respectively indicate specific states of the three permissions.

For example, a field #0 may be used to carry a bit (denoted as a bit #0) that indicates a read access permission, and the bit #0 may be used to indicate whether the memory space (specifically, data in the memory space) corresponding to the HPA (or the GPA) allows to be read by the guest. The bit #0 may include one bit or may include a plurality of bits. This is not particularly limited in this application, provided that the processing unit 112 and the memory control unit 114 can agree on interpretations of different values of the bit #0. For example, when the bit #0 is "0", it may indicate that the memory space does not allow to be read by the guest. For another example, when the bit #0 is "1", it may indicate that the memory space allows to be read by the guest.

For another example, a field #1 may be used to carry a bit (denoted as a bit #1) that indicates a write access permission, and the bit #1 may be used to indicate whether the memory space corresponding to the HPA (or the GPA) allows to be written by the guest. The bit #1 may include one bit or may include a plurality of bits. This is not particularly limited in this application, provided that the processing unit 112 and the memory control unit 114 can agree on interpretations of different values of the bit #1. For example, when the bit #1 is "0", it may indicate that the memory space does not allow to be written by the guest. For another example, when the bit #1 is "1", it may indicate that the memory space allows to be written by the guest.

For another example, a field #2 may be used to carry a bit (denoted as a bit #2) that indicates an execution access permission, and the bit #2 may be used to indicate whether the memory space (specifically, code or an instruction stored in the memory space) corresponding to the HPA (or the GPA) allows to be executed by the guest. The bit #2 may include one bit or may include a plurality of bits. This is not particularly limited in this application, provided that the processing unit 112 and the memory control unit 114 can agree on interpretations of different values of the bit #2. For example, when the bit #2 is "0", it may indicate that the memory space does not allow to be executed by the guest. For another example, when the bit #2 is "1", it may indicate that the memory space allows to be executed by the guest.

A corresponding access permission flag is set in the EPT, to control access of the guest to a specific physical page. When a guest violates permission control of a corresponding flag bit during execution, for example, reads content of a physical page whose read access permission is set to access forbidden, a page exception (EPT violation) is triggered.

A non-execute (NX) flag of the specific physical page is set in the EPT, to be specific, a bit #2 flag bit that corresponds to the physical page and that is in an entry of the EPT is set, to monitor a behavior that the guest executes code in the specific physical page. For example, when a process in the guest invokes an external function, the instruction execution is redirected to code of a physical page in which the external function is located. If a non-execute flag is set on the physical page, a page exception is immediately triggered. It should be understood that logical architectures shown in FIG. 2 and FIG. 3 are merely examples for describing a scenario used in the process monitoring method provided in this application, and this application is not limited thereto. The process monitoring method provided in the embodiments of this application is also applicable to another scenario. For example, only one operating system (or guest) may run on a virtual machine. In this case, the GPA does not need to be introduced, and only a mapping from the GVA to the HPA (a conventional page table) needs to be saved, so that a process that runs on the guest can access the memory of the host.

In this application, an execution access permission is emphatically set, to be specific, a value of the field #2 is set. Without distinction, setting an access rule of a segment of memory space specifically means setting the execution access permission. For example, setting an access rule of a specific segment of memory space to access forbidden means execution forbidden, and setting an access rule of a specific segment of memory space to access allowed means execution allowed.

The computing device 100 shown in FIG. 1 in the embodiments of this application may be a host in which a sandbox system is located. A virtual machine that runs on the computing device 100 provides a running environment of a sample program, and monitors, by using a VMM or a monitoring program that runs on a secure virtual machine, an access behavior of a target process generated by the sample program.

A sandbox technology emerges in a historical background. With continuous development of advanced persistent threat (APT) attacks, advanced malicious code is also advancing rapidly, and it is increasingly difficult for conventional static malicious code detection that is based on a feature code matching technology to deal with the advanced malicious code. A feature detection technology that is based on a dynamic behavior during program running is gradually accepted and adopted by security solution vendors. It is proved by practice that the sandbox is an effective system for detecting malicious code based on monitoring of a dynamic behavior. An isolated real running environment is constructed, and all behaviors of the sample program (specifically, a process generated by a sample program) during execution are monitored and recorded, and submitted to a back-end analysis engine for analysis, to determine whether code of the sample program is malicious code.

Due to widespread use of the sandbox system, the advanced malicious code correspondingly enhances an anti-sandbox-monitoring technology. For example, the malicious code detects a running environment during initial running, and determines whether the malicious code currently runs in the sandbox system. If the malicious code currently runs in the sandbox system, the malicious code directly quits running, to avoid behavior monitoring of the sandbox system. In addition, the malicious code may also cause a monitoring failure to the sandbox by damaging a behavior monitoring mechanism of the sandbox system. Therefore, a set of efficient sandbox system needs to have very strong anti-detection and anti-damage capabilities. Finally, with a rapid increase in a quantity of sample programs, to cope with analysis tasks of a huge quantity of sample programs of a user, the sandbox system further needs to have a high-performance monitoring capability, and overheads caused by behavior monitoring needs to be very low, to support large-scale concurrent monitoring.

A monitored process is generated after the sample program is run by the processing unit. The monitored process generates a series of behaviors during execution. Based on different semantic complexities of the behaviors, there are simple behaviors, such as execution of a specific instruction, or invoking of external code.

Figure 4:
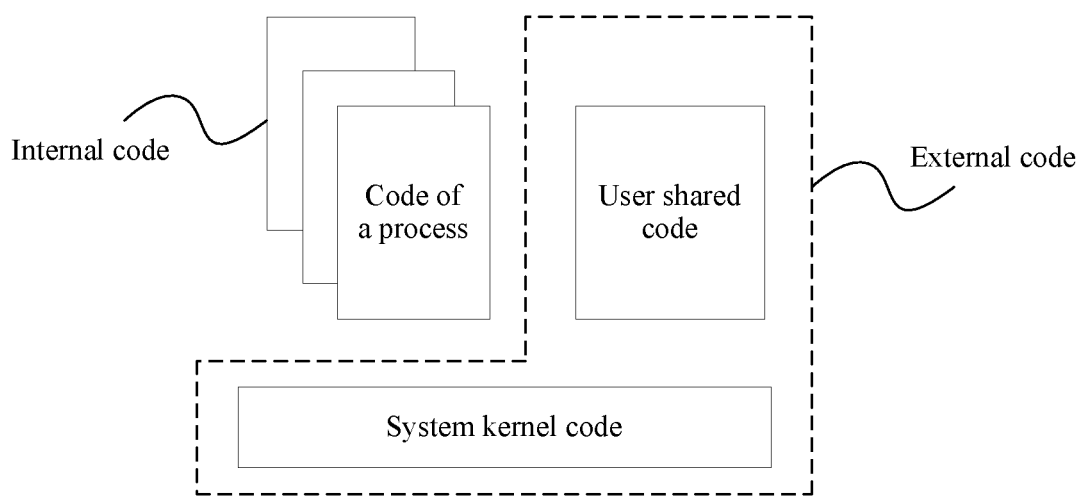
FIG. 4 is a schematic diagram of classification of code stored in a memory according to an embodiment of this application.

As shown in FIG. 4, in the embodiments of this application, code stored in the memory may be classified into two types: internal code and external code.

The internal code and the external code are relative to a process generated by a program. For the process, the internal code is code of the program that generates the process, belongs to the process, and is code that is not shared with another process, for example, a segment (usually a TEXT segment) that has an executable attribute in a PE file of a Windows process. T1 is used to represent a code segment of a process 1. An internal code set Tall of all processes running in the system is {T1, T2, . . . , Tn}, and n indicates a quantity of processes running in the system. The processes are classified into a target process and a non-target process. The target process is a process whose behavior needs to be monitored by the sandbox system, and includes a process generated by a sample program and a child process that is further generated by the process generated by the sample program. The non-target process is another normal process that runs in the system, and is not monitored by the sandbox system. It is defined that s-Tall={s-T1, . . . , s-T2, s-Ti} represents a code set of all target processes (or sample programs), and ns-Tall={ns-T1, ns-T2, . . . ns-Tj} represents a code set of all non-target processes (or non-sample programs), and therefore Tall is {s-Tall, ns-Tall}.

The external code is code shared by all processes in global.

For example, the external code may further include code of an external function. The external function may be a function other than a process function, and the process function is a function included in program code for generating a process.

For example, the code of the external function may include code of a user-mode shared library (or may be referred to as process shared code), such as kernel32.dll and user32.dll that are in a Windows system, and a c-runtime library libc.so in a Linux system.

For another example, the external code may further include all kernel-mode code, such as kernel code of an operating system and code of a device driver. As an example instead of a limitation, in the embodiments of this application, only one piece of external code may exist in the memory 120. Each process maps these shared physical memories to virtual address space of the process through virtual memory mapping, for sharing.

Assuming that Sdll represents the code of the user-mode shared library, Skernel represents the kernel code of the operating system, and Sdriver1 represents code of a device driver 1, an external code set Sall is {Skernel, Sdll1, Sdriver2, Sdll2, Sdriver2, . . . , Sdlln, Sdrivern}.

In the embodiments of this application, during execution, the target process continuously invokes the external code to obtain a service provided by the system. Invoking the external code reflects a behavior that the target process requests the system for the service. For example, in a Windows system, the target process may invoke a ReadFile function in a shared library kernel32.dll when needing to read content of a file. A behavior that the target process invokes the external code is monitored and recorded, to effectively help a sandbox back-end engine detect a suspected malicious target process, or generate a sample program (a suspected malicious program for short in this application) of a suspected malicious target process.

According to the process monitoring method provided in the embodiments of this application, the behavior that the target process invokes the external code can be effectively monitored.

Various steps performed by the processing unit in the process monitoring method in the embodiments of this application may be directly performed by a hardware decoding processing unit, or performed by a combination of hardware in a decoding processing unit and a software module. The software module may be located in a mature storage medium in the art, such as a random access memory, a flash memory, a read-only memory, a programmable read-only memory, an electrically erasable programmable memory, and a register. The storage medium is located in a memory. The processing unit reads information in the memory, and performs, in combination with hardware of the processing unit, various steps that are performed by the processing unit in the process monitoring method in the embodiments of this application. The following describes in detail a process monitoring method 200 in an embodiment of this application with reference to FIG. 5 to FIG. 11.

A process in which a process (denoted as a process #A) invokes external code (denoted as external code #B) is used as an example to describe the method 200 in detail.

In this embodiment of this application, a process may include a target process that needs to be monitored (for example, a process generated by a sample program) and a non-target process that does not need to be monitored (for example, a process generated by a non-sample program). The process #A may be a target process or may be a non-target process. This is not particularly limited in this application.

As an example instead of a limitation, the external code #B may include code of one or more external functions. For example, the external code #B may include code shared by one or more processes. For another example, the external code #B may include one or more pieces of system kernel code.

For ease of understanding, in the following, memory space used to store the external code #B in a memory 120 is denoted as memory space #B, a physical address of the memory space #B is denoted as a physical address #B, and a virtual address of the memory space #B is denoted as a virtual address #B. To be specific, in this embodiment of this application, the physical address #B may be a physical address of memory space that stores one or more pieces of code in Sall. In addition, in the following, memory space used to store code of a process #A (or code that is used to generate a program of the process #A) in the memory 120 is denoted as memory space #A, a physical address of the memory space #A is denoted as a physical address #A, and a virtual address of the memory space #A is denoted as a virtual address #A.

Figure 5:
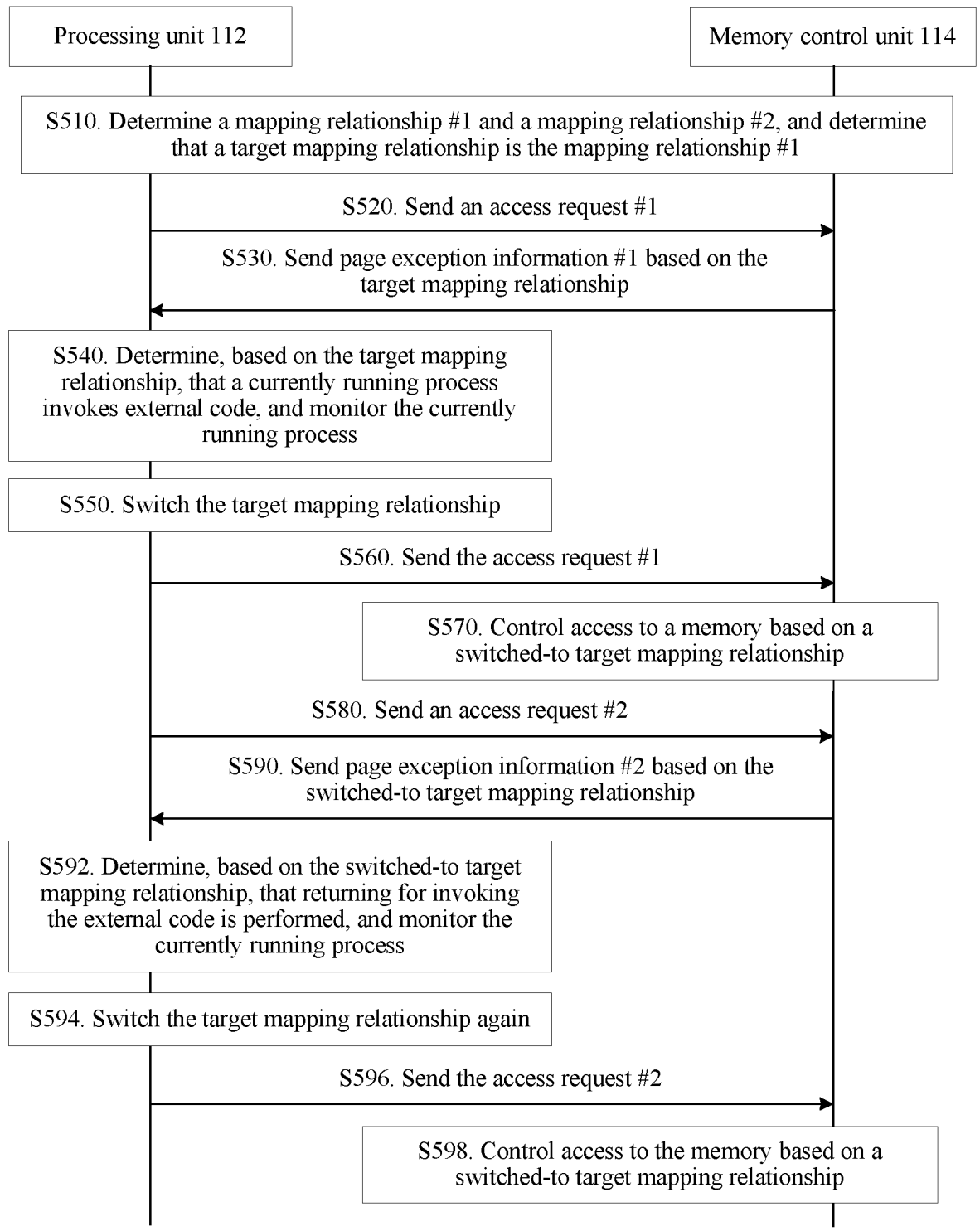
FIG. 5 is a schematic interaction diagram of a process monitoring method according to an embodiment of this application.

As shown in FIG. 5, in S510, a processing unit 112 may determine a mapping relationship #1 and a mapping relationship #2.

The mapping relationship #1 and the mapping relationship #2 are used to indicate a mapping relationship between the physical address #B and the virtual address #B.

For example, in this embodiment of this application, the mapping relationship #1 and the mapping relationship #2 each may be an EPT.

In this case, the physical address #B may be an HPA of a host shown in FIG. 3, and the virtual address #A may be a GPA of a guest on which the process #A runs. In addition, as an example instead of a limitation, in this case, the virtual address #A may be determined based on the GPT in FIG. 3.

It should be understood that a form of the foregoing "mapping relationship between the physical address #B and the virtual address #B" is merely an example for description, and this application is not limited thereto. For example, the mapping relationship may be alternatively a mapping relationship (a conventional page table) from a virtual address (for example, a GVA) to a physical address (for example, an HPA) used in memory management of a conventional host system. The following uses an example in which the EPT is used as the foregoing mapping relationship, to describe in detail the process monitoring method in this embodiment of this application. The mapping relationship determining method and process may be similar to those in the prior art. To avoid repetition, detailed descriptions thereof are omitted.

In this embodiment of this application, the mapping relationship #1 and the mapping relationship #2 are further used to indicate an access rule of the physical address #B. In addition, the mapping relationship #1 and the mapping relationship #2 indicate different access rules of the physical address #B.

Optionally, it is assumed that an access rule that is of the physical address #B and that is indicated by the mapping relationship #1 is access forbidden. The access forbidden may indicate that the memory space #B indicated by the physical address #B does not allow to be read, the access forbidden may indicate that the memory space #B indicated by the physical address #B does not allow to be written, or the access forbidden may indicate that code stored in the memory space #B indicated by the physical address #B does not allow to be executed.

Figure 6:
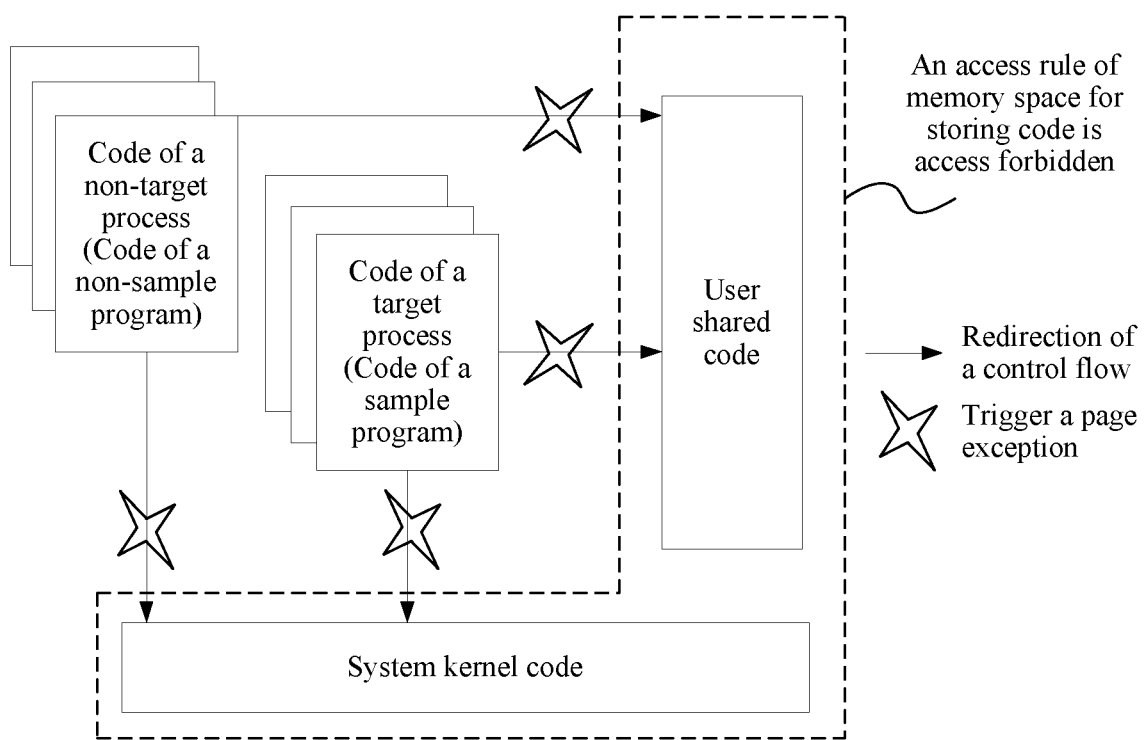
FIG. 6 is a schematic diagram of an example of an access rule that is of a physical address of storage space of external code and that is recorded in a mapping relationship according to an embodiment of this application.

Optionally, as shown in FIG. 6, in this embodiment of this application, all access rules that are of memory space (the memory space #B) used to store external code and that are recorded in the mapping relationship #1 are set to access forbidden. In addition, in this embodiment of this application, although not shown in FIG. 6, all access rules that are of the memory space (the memory space #B) used to store the external code and that are recorded in the mapping relationship #2 are set to access allowed.

In this embodiment of this application, a storage device (for example, some memory space of the memory 120) of a computing device 100 may include storage space used to store a target mapping relationship. The target mapping relationship is a mapping relationship used when a memory control unit 114 controls access to the memory 120, to be specific, the target mapping relationship is one of the mapping relationship #1 and the mapping relationship #2.

In this embodiment of this application, when the processing unit 112 detects that the process #A starts to run (denoted as a moment #1), the processing unit 112 may set the target mapping relationship to the mapping relationship #1.

In a time period (denoted as a time period #a) between the moment #1 and a moment #2, the mapping relationship used when the memory control unit 114 controls access to the memory 120 is the mapping relationship #1. The moment #2 is a moment at which the processing unit 112 performs switching processing #1 on the target mapping relationship.

S520. At a moment in the time period #a (or a moment after the moment #1), the processing unit 112 needs to access the memory space #B in a process of executing the code of the process #A. For example, the code of the process #A indicates that external code stored in the memory space #B needs to be invoked (or executed). The processing unit 112 determines a virtual address (the virtual address #B) of the memory space #B. For example, the virtual address #B may be a GPA. The processing unit 112 sends an access request #1 to the memory control unit 114, and the access request #1 carries the virtual address #B.

Correspondingly, the memory control unit 114 receives the access request #1, and the memory control unit 114 searches the current target mapping relationship (the mapping relationship #1) for the physical address (the physical address #B) corresponding to the virtual address #B. For example, as described above, the physical address #B may be an HPA. In addition, the memory control unit 114 can determine, based on the current target mapping relationship (the mapping relationship #1), that an access rule of the memory space (the memory space #B) corresponding to the physical address #B is access forbidden.

S530. Because the access rule that is of the memory space #B and that is indicated by the current target mapping relationship (the mapping relationship #1) is access forbidden, the memory control unit 114 triggers a page exception. To be specific, the memory control unit 114 sends page exception information to the processing unit 112. For ease of understanding and distinguishing, the page exception information sent in S530 is denoted as page exception information #1.

S540. The processing unit 112 determines, based on the page exception information #1, that memory space that stores external code is accessed, or the processing unit 112 may determine that a currently running process (the process #A) (for example, a process that runs when the processing unit 112 receives the page exception information #1) invokes external code that needs to be monitored. As an example instead of a limitation, the processing unit 112 may determine the currently running process based on a CPU context.

In this case, the processing unit 112 may monitor the process #A. Monitoring may be specifically implemented by using a VMM. Monitored content includes but is not limited to obtaining of context information of the process #A, a function name of the invoked external code, a parameter value transferred when invoking occurs, a return value, and the like. The monitored content and a process monitoring process of the processing unit may be similar to those in the prior art. To avoid repetition, detailed descriptions thereof are omitted herein.

Optionally, the processing unit 112 may further first determine whether the process #A is a target process, and then monitor the process #A when determining that the process #A is a target process. Therefore, processing overheads caused by the monitoring can be reduced.

As an example instead of a limitation, the processing unit 112 may determine a parent process of the process #A, and determine, depending on whether the parent process of the process #A is a target process, whether the process #A is a target process, or determine whether the process #A needs to be monitored.

For example, if the parent process of the process #A is a target process, the processing unit 112 may determine that the process #A is a target process that needs to be monitored.

For example, if the parent process of the process #A is not a target process, the processing unit 112 may determine that the process #A is not a target process.

As an example instead of a limitation, whether the parent process of the process #A is a target process may be preset by a user or an administrator. Alternatively, whether the parent process of the process #A is a target process may be determined by a server and delivered to the computing device 100 on which a monitoring program runs, and then be set by the monitoring program in the computing device 100. Alternatively, whether the parent process of the process #A is a target process may be determined by the computing device 100 based on a source of the parent process of the process #A. For example, the processing unit 112 may further determine whether a program that generates the process #A is a sample program, and monitor the process #A when determining that the program is a sample program.

As an example instead of a limitation, whether the program is a sample program may be preset by the user or the administrator. Alternatively, whether the program is a sample program may be determined by the server and delivered to the computing device 100 on which the monitoring program runs, and then be set by the monitoring program in the computing device 100.

S550. At the moment #2, the processing unit 112 performs switching processing on the target mapping relationship based on the page exception information #1. To distinguish the switching processing in S550 from that in another step, the switching processing in S550 is denoted as the switching processing #1 herein, and the switching processing #1 is used to switch the target mapping relationship from the mapping relationship #1 to the mapping relationship #2.

In a time period with specific duration after the moment #2, for example, in a time period (denoted as a time period #b) between the moment #2 and a moment #3, a mapping relationship used when the memory control unit 114 controls access to the memory 120 is the mapping relationship #2. The moment #3 is a moment at which the processing unit 112 performs switching processing #2 on the target mapping relationship.

S560. At a moment in the time period #b (or a moment after the moment #2), the processing unit 112 re-sends the access request #1 to the memory control unit 114.

Correspondingly, the memory control unit 114 can receive the re-sent access request #1 at a moment in the time period #b, and determine a current target mapping relationship (the mapping relationship #2).

S570. The memory control unit 114 searches the current target mapping relationship (the mapping relationship #2) for the physical address (the physical address #B) corresponding to the virtual address #B. Because an access rule that is of the memory space #B and that is indicated by the current target mapping relationship (the mapping relationship #2) is access allowed, the memory control unit 114 controls, based on the access request #1, access of the processing unit 112 to the memory space #B, for example, reading and executing the external code stored in the memory space #B.

Therefore, the process #A completes access to the memory space #B.

During execution of the external code stored in the memory space #B, the external code stored in the memory space #B may return data to the process A. In this case, the external code stored in the memory space #B indicates that the memory space #A needs to be accessed.

Optionally, the mapping relationship #1 and the mapping relationship #2 may be further used to indicate a mapping relationship between the physical address #A and the virtual address #A. In this embodiment of this application, the mapping relationship #1 and the mapping relationship #2 are further used to indicate an access rule of the physical address #A. In addition, the mapping relationship #1 and the mapping relationship #2 indicate different access rules of the physical address #A.

In this embodiment of this application, the external code performs returning after the process invokes the external code (at a moment in the time period #b), and therefore, when the external code performs returning, a current target mapping relationship is the mapping relationship #2.

To monitor the returning by the external code, an access rule that is of the physical address #A and that is indicated by the mapping relationship #2 may be set to access forbidden. As an example instead of a limitation, the access forbidden may indicate that the memory space #A indicated by the physical address #A does not allow to be read, the access forbidden may indicate that the memory space #A indicated by the physical address #A does not allow to be written, or the access forbidden may indicate that code stored in the memory space #A indicated by the physical address #A does not allow to be executed.

In addition, an access rule that is of the physical address #A and that is indicated by the mapping relationship #1 is set to access allowed. As an example instead of a limitation, the access allowed may indicate that the memory space #A indicated by the physical address #A allows to be read, the access allowed may indicate that the memory space #A indicated by the physical address #A allows to be written, or the access allowed may indicate that code stored in the memory space #A indicated by the physical address #A allows to be executed.

Figure 7:
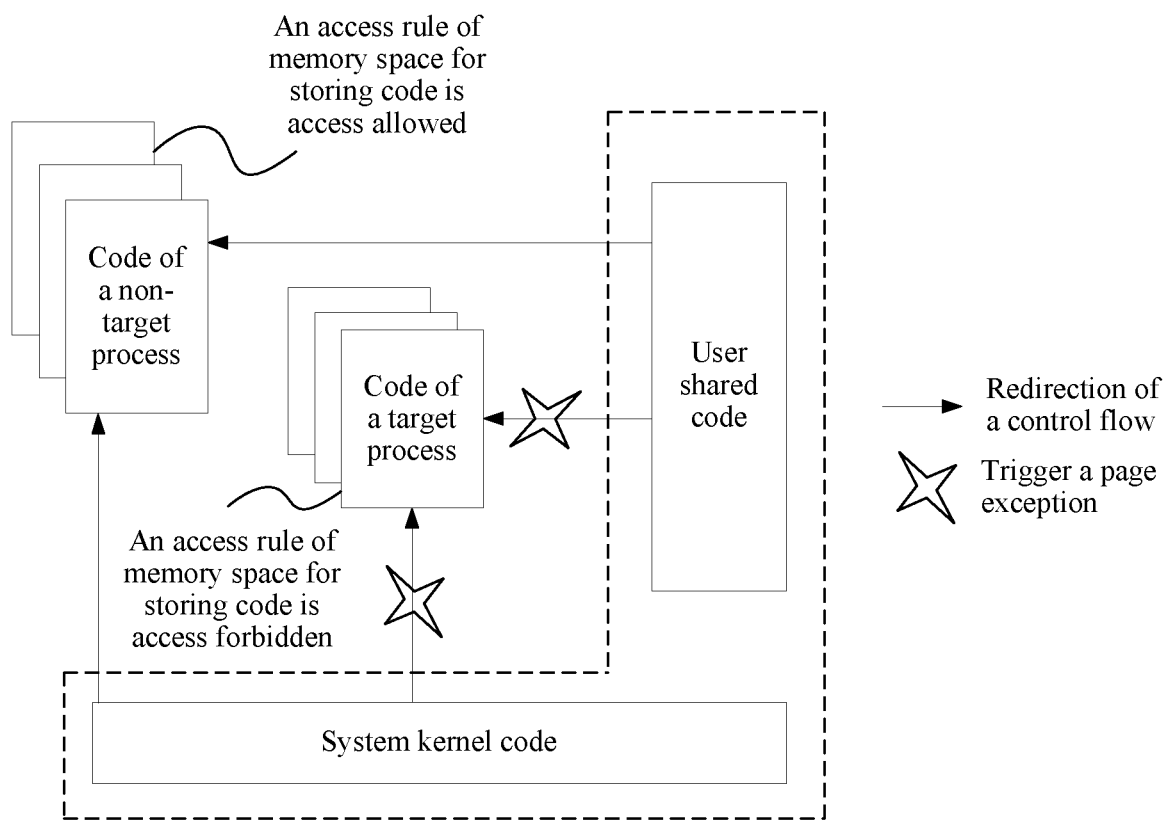
FIG. 7 is a schematic diagram of an example of an access rule that is of a physical address of storage space of internal code and that is recorded in another mapping relationship according to an embodiment of this application.

As shown in FIG. 7, in this embodiment of this application, an access rule that is of memory space (the memory space #A) used to store program code of a target process and that is recorded in the mapping relationship #2 is set to access forbidden. In addition, although not shown in FIG. 7, an access rule that is of the memory space (the memory space #A) used to store the program code of the target process and that is recorded in the mapping relationship #1 is set to access allowed.

A processing process in which the process #A is a target process is used as an example for description.

S580. After S570, at a moment in the time period #b, the processing unit 112 executes code (for example, code of an external function) stored in the memory space #B and needs to access the memory space #A. For example, the code stored in the memory space #B indicates that a code execution result needs to be returned to the process #A. The processing unit 112 determines the virtual address (the virtual address #A) of the memory space #A corresponding to the process #A, and sends an access request #2 to the memory control unit 114, where the access request #2 carries the virtual address #A. For example, the virtual address #A may be a GPA.

Correspondingly, the memory control unit 114 receives the access request #2, and the memory control unit 114 searches the current target mapping relationship (the mapping relationship #2) for the physical address (the physical address #A) corresponding to the virtual address #A. For example, the physical address #A may be an HPA. In addition, the memory control unit 114 can determine, based on the current target mapping relationship (the mapping relationship #2), that an access rule of the memory space (the memory space #A) corresponding to the physical address #A is access forbidden.

S590. Because the access rule that is of the memory space #A and that is indicated by the current target mapping relationship (the mapping relationship #2) is access forbidden, the memory control unit 114 triggers a page exception.

To be specific, the memory control unit 114 sends page exception information to the processing unit 112. For ease of understanding and distinguishing, the page exception information sent in S590 is denoted as page exception information #2.

S592. The processing unit 112 determines, based on the page exception information #2, that the external code needs to return to monitored process, in other words, the processing unit 112 determines that the currently running process (the process #A) returns from invocation of the external code. As an example instead of a limitation, the processing unit 112 may determine the currently running process based on a CPU context.

In this case, the processing unit 112 may monitor the process #A. For a meaning of the monitoring, refer to the descriptions in S540.

Optionally, the processing unit 112 may further first determine whether the process #A is a target process, and then monitor the process #A when determining that the process #A is a target process. Therefore, processing overheads caused by the monitoring can be reduced.

S594. At the moment #3, the processing unit 112 performs switching processing on a target mapping relationship based on the page exception information #2. To distinguish switching processing in S594 from that in another step, herein, the switching processing in S594 is denoted as the switching processing #2, and the switching processing #2 is used to switch the target mapping relationship from the mapping relationship #2 to the mapping relationship #1.

In a time period with specific duration after the moment #3, for example, in a time period (denoted as a time period #c) between the moment #3 and a moment at which the target mapping relationship is switched next time, a mapping relationship used when the memory control unit 114 controls access to the memory 120 is the mapping relationship #1.

S596. At a moment in the time period #c, the processing unit 112 re-sends the access request #2 to the memory control unit 114.

Correspondingly, the memory control unit 114 can receive the re-sent access request #2 in the time period #c, and determine a current target mapping relationship (the mapping relationship #1).

S598. The memory control unit 114 searches the current target mapping relationship (the mapping relationship #1) for the physical address (the physical address #A) corresponding to the virtual address #A. Because the access rule that is of the memory space #A and that is indicated by the current target mapping relationship (the mapping relationship #1) is access allowed, the memory control unit 114 accesses the memory space #A based on the access request #2, for example, writes a processing result returned by the external code into the memory space #A, or returns the processing result to the process #A.

Therefore, returning for invoking the external code is completed.

In addition, it should be noted that if the process #A is a non-target process, an access rule that corresponds to the physical address #A and that is recorded in the mapping relationship #2 is access allowed. Therefore, in the time period #b, the memory control unit 114 may directly allow, based on the current target mapping relationship (the mapping relationship #2), memory access based on the access request #2, without a need to perform the switching processing #2.

Figure 8:
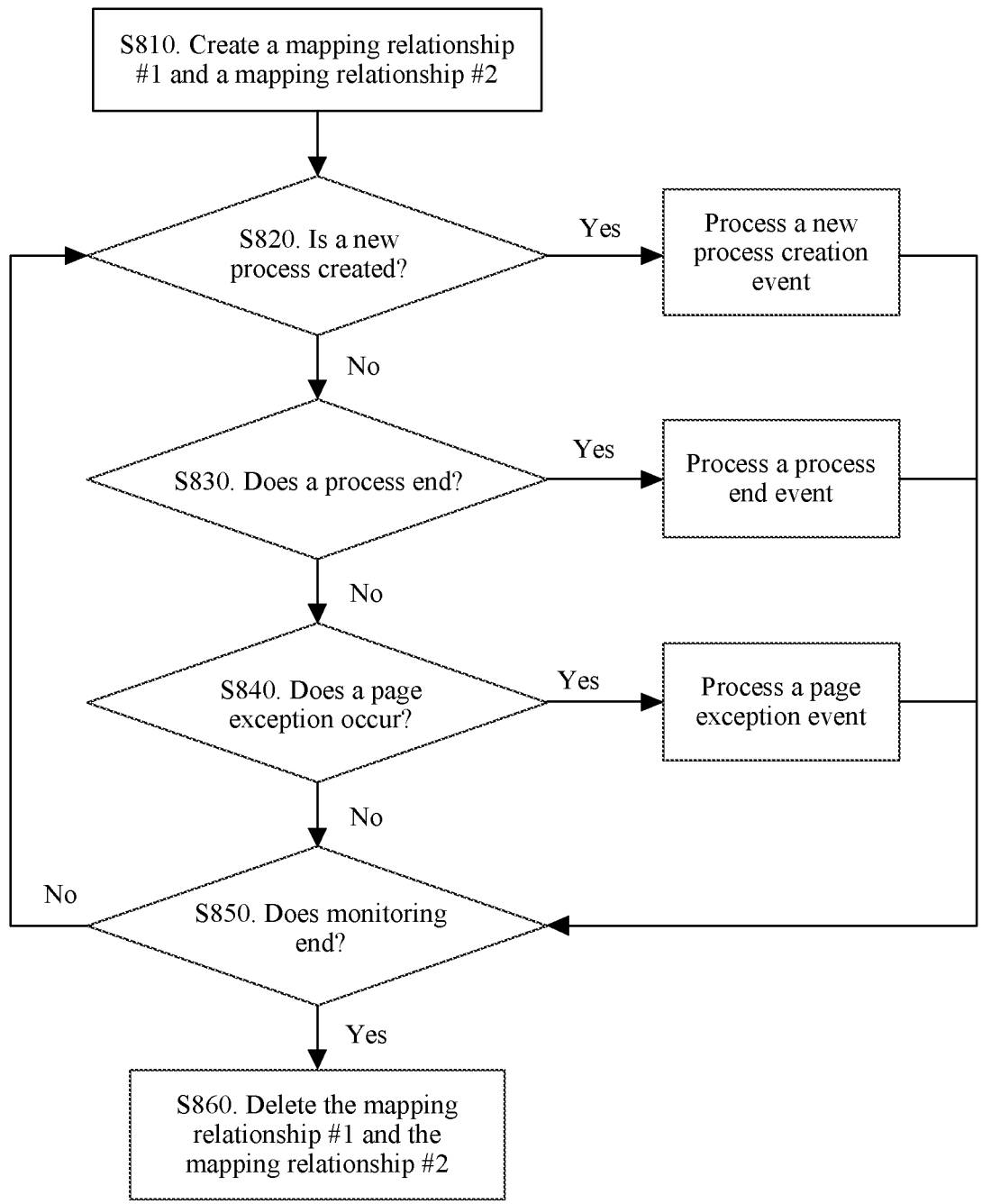
FIG. 8 is a schematic diagram of steps performed by a processing unit in a monitoring process according to an embodiment of this application.

FIG. 8 shows actions performed by a processing unit 112 in the process monitoring method according to an embodiment of this application.

S810. The processing unit 112 may create an initial mapping relationship #1 and an initial mapping relationship #2. In the mapping relationship #1, an access rule of memory space used to store external code is access forbidden. Correspondingly, in the mapping relationship #2, an access rule of the memory space used to store the external code is access allowed.

Optionally, the processing unit 112 may further determine an access rule of memory space used to store internal code of a process.

In the mapping relationship #2, an access rule of memory space used to store internal code of a target process is access forbidden. Correspondingly, in the mapping relationship #1, an access rule of the memory space used to store the internal code of the target process is access allowed.

Optionally, in this embodiment of this application, an exception is triggered to implement monitoring. To prevent frequently triggered exceptions from affecting processing performance of a host, an access rule of memory space used to store internal code of a non-target process may be set to access allowed in the mapping relationship #2 and the mapping relationship #1. In this way, when the memory space used to store the internal code of the non-target process is accessed, no exception is triggered.

Optionally, when creating a process, the processing unit 112 may determine, depending on whether a parent process of the process is a target process, whether the created process is a target process.

S820. The processing unit determines whether a new process (for example, a new child process) is created, and processes a new process creation event if determining that a new process is created, or performs S830 if determining that no new process is created.

S830. The processing unit determines whether a running process ends, and processes a process end event if determining that a process ends, or performs S840 and if determining that no process ends.

S840. The processing unit determines whether a page exception occurs, and may process a page exception event if determining that a page exception occurs, or may perform S850 if determining that no page exception occurs.

S850. The processing unit determines whether a monitoring process ends, and quits monitoring and deletes the mapping relationship #1 and the mapping relationship #2 if determining that the monitoring ends, or returns to S820 if determining that the monitoring does not end.

Figure 9:
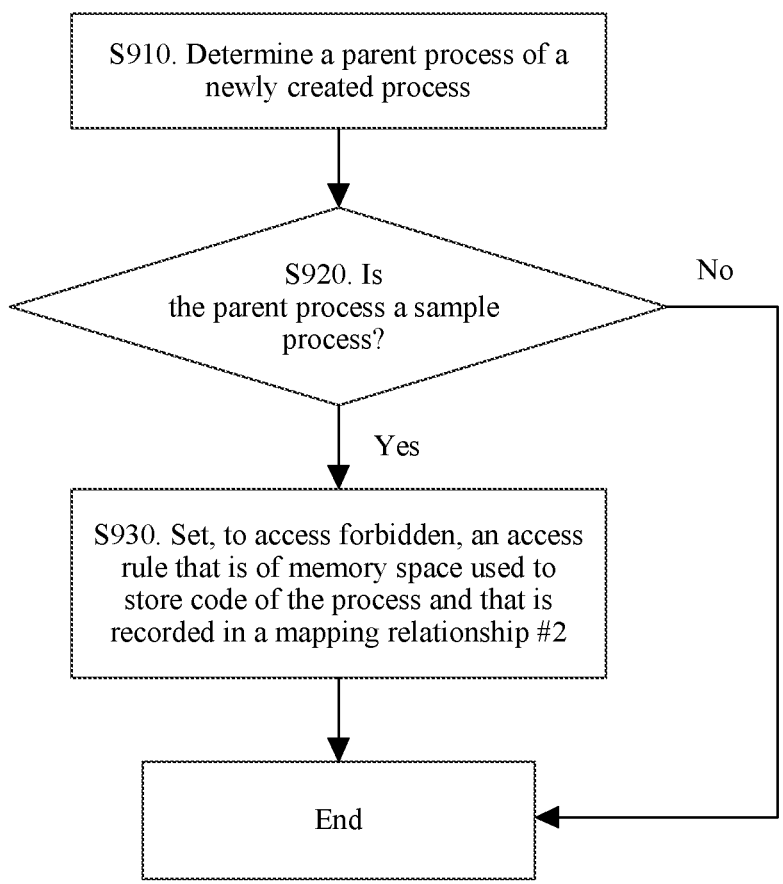
FIG. 9 is a schematic flowchart of a process creation process of a processing unit according to an embodiment of this application.

FIG. 9 shows actions performed by the processing unit 112 during processing of the new process creation event according to an embodiment of this application, and is a detailed description of processing the new process creation event in FIG. 8.

S910. The processing unit 112 determines a parent process of a new process.

S920. The processing unit 112 determines whether the parent process is a target process, and performs S930 if the parent process is a target process, or quits processing the new process creation event if the parent process is not a target process.

S930. The processing unit 112 sets, to access forbidden, an access rule that is of memory space used to store internal code of the new process and that is included in the mapping relationship #2.

Figure 10:
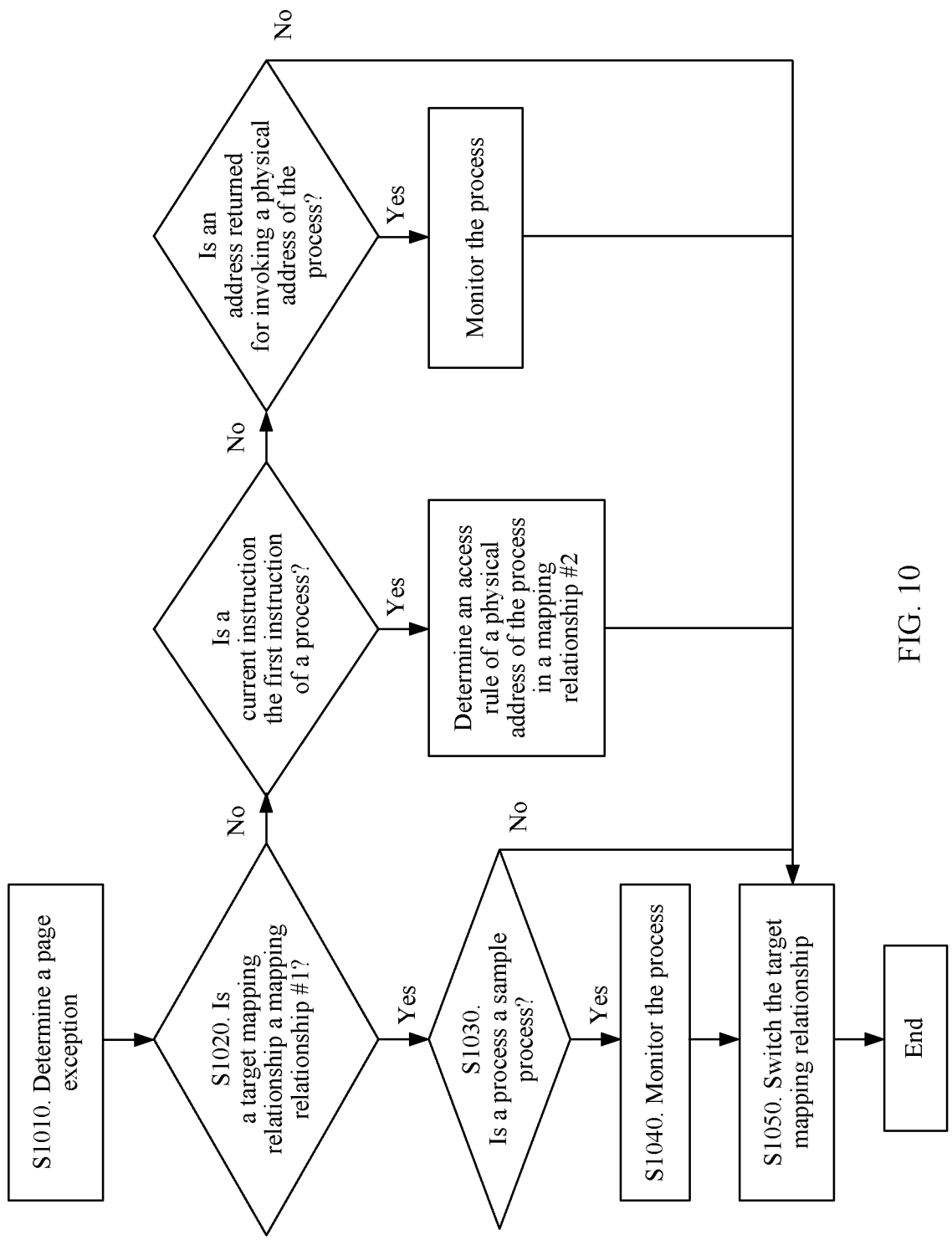
FIG. 10 is a schematic flowchart of a process monitoring process of a processing unit according to an embodiment of this application.

FIG. 10 shows actions performed by the processing unit 112 during processing of the page exception event according to an embodiment of this application, and is a detailed description of processing the page exception event in FIG. 8.

S1010. The processing unit 112 receives page exception information sent by a memory control unit 114, and determines a process that is running when the page exception information is received. For example, the processing unit 112 may determine an identifier of the running process based on information such as a CPU context, to determine the process indicated by the identifier.

S1020. The processing unit 112 determines whether a target mapping relationship that is used when the page exception information is received is the mapping relationship #1.

If it is determined that the target mapping relationship is the mapping relationship #1, S1030 is performed.

If it is determined that the target mapping relationship is not the mapping relationship #1, in other words, if it is determined that the target mapping relationship is the mapping relationship #2, it may be further determined whether an access request that triggers a page exception indicated by the page exception information is the first memory access request sent by the process.

If the access request that triggers the page exception is the first memory access request sent by the process, the processing unit 112 may determine, depending on whether a parent process of the process is a target process, an access rule that is of memory space used to store program code of the process and that is included in the mapping relationship #2. For example, if the parent process of the process is a target process, the access rule that is of the memory space used to store the program code of the process and that is included in the mapping relationship #2 is access forbidden. If the parent process of the process is not a target process, the access rule that is of the memory space used to store the program code of the process and that is included in the mapping relationship #2 is access allowed.

If the access request that triggers the page exception is not the first memory access request sent by the process, the processing unit 112 may determine whether a physical address carried in the access request that triggers the page exception is a physical address of the memory space used to store the program code of the process.

If it is determined that the physical address carried in the access request that triggers the page exception is the physical address of the memory space used to store the program code of the process, monitoring of the process is triggered, and S1050 is performed.

If it is determined that the physical address carried in the access request that triggers the page exception is not the physical address of the memory space used to store the program code of the process, S1050 is directly performed.

S1030. The processing unit may determine whether the process that is running when the page exception information is received is a target process.

If the process is a target process, S1040 is performed.

If the process is not a target process, S1050 is performed.

S1040. The processing unit 112 may monitor the process. For example, the processing unit 112 may record a behavior that the process invokes external code. For another example, the monitoring may be specifically implemented by using a VMM. Monitored content includes but is not limited to obtaining of context information of the process, a function name of the invoked external code, a parameter value transferred when invoking occurs, a return value, and the like. The monitored content and a process monitoring process of the processing unit 112 may be similar to those in the prior art. To avoid repetition, detailed descriptions thereof are omitted herein.

S1050. The processing unit 112 may switch the target mapping relationship. If the currently used target mapping relationship is the mapping relationship #1, the target mapping relationship is switched to the mapping relationship #2. If the currently used target mapping relationship is the mapping relationship #2, the target mapping relationship is switched to the mapping relationship #1.

Figure 11:
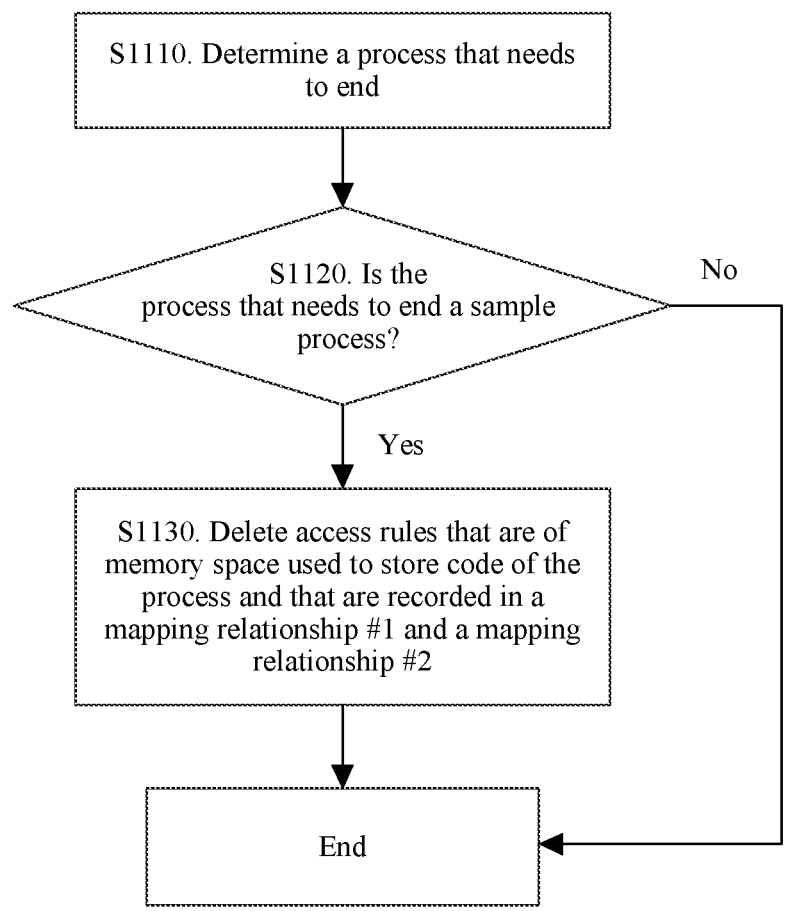
FIG. 11 is a schematic flowchart of a process end process of a processing unit according to an embodiment of this application.

FIG. 11 shows actions performed by the processing unit 112 during processing of the process end event according to an embodiment of this application, and is a detailed description of processing the process end event in FIG. 8. As shown in FIG. 11, in S1110, the processing unit 112 may determine a process that currently needs to end.

S1120. The processing unit 112 determines whether the process that needs to end is a target process.

If the process that needs to end is a target process, S1130 may be performed.

If the process that needs to end is not a target process, the processing unit 112 may quit processing the process end event.

S1130. The processing unit 112 may remove the process from a target process set, delete an access rule of a physical address corresponding to the process, and quit processing the process end event.

According to the process monitoring method in the embodiments of this application, the processing unit may configure a first mapping relationship and a second mapping relationship, the first mapping relationship and the second mapping relationship indicate a same mapping relationship between a virtual address and a physical address, and the first mapping relationship and the second mapping relationship indicate different access rules of the physical address. When a first process starts to run, the processing unit sets the first mapping relationship in which an access rule is access forbidden as a target mapping relationship used when the memory control unit controls access to the memory. When code of the first process indicates that memory space corresponding to a first physical address needs to be accessed, the memory control unit reports page exception information to the processing unit because the target mapping relationship (the first mapping relationship) indicates that the access rule of the first physical address is access forbidden. The processing unit can trigger monitoring on the first process based on the page exception information, switch the target mapping relationship from the first mapping relationship to the second mapping relationship, and re-send an access request. Because a switched-to target mapping relationship (the second mapping relationship) indicates that the access rule of the first physical address is access allowed, the memory control unit can allow the memory space corresponding to the first physical address to be accessed. The process can be monitored without affecting access of the process to the memory. According to the process monitoring method and an apparatus in the embodiments of this application, a behavior that a process invokes an external function can be monitored without modifying code of the process and code of the external function.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A process monitoring method performed by a computing device that comprises a processing unit, a memory, and a memory control unit, comprising:
   determining, by the processing unit, a first mapping relationship and a second mapping relationship, wherein the first mapping relationship indicates a mapping relationship between a first virtual address and a first physical address and the second mapping relationship also indicates a mapping relationship between the first virtual address and the first physical address, and the first mapping relationship and the second mapping relationship both indicate an access rule of the first physical address, wherein the first mapping relationship indicates that the access rule of the first physical address is access forbidden, and the second mapping relationship indicates that the access rule of the first physical address is access allowed, wherein the first physical address is a physical address of a first memory space in the memory, the first memory space is different from a second memory space in the memory, and the second memory space stores program code for generating a first process;
   when the first process starts to run, determining, by the processing unit, that a target mapping relationship is the first mapping relationship, wherein the target mapping relationship is used when the memory control unit controls access to the memory;
   when the first process needs to access the first memory space, sending, by the processing unit, a first access request to the memory control unit, wherein the first access request includes the first virtual address;
   receiving, by the processing unit, first exception information sent by the memory control unit, when the memory control unit determines that the access rule of the first physical address in the target mapping relationship is access forbidden;
   monitoring, by the processing unit, the first process based on the first exception information;
   switching, by the processing unit, the target mapping relationship to switch the target mapping relationship from the first mapping relationship to the second mapping relationship; and
   re-sending, by the processing unit, the first access request to the memory control unit.

2. The method according to claim 1, wherein the first mapping relationship indicates a mapping relationship between a second virtual address and a second physical address and the second mapping relationship also indicates a mapping relationship between the second virtual address and the second physical address, and the first mapping relationship and the second mapping relationship both indicate an access rule of the second physical address, wherein the first mapping relationship indicates that the access rule of the second physical address is access allowed, the second mapping relationship indicates that the access rule of the second physical address is access forbidden, and the second physical address is a physical address of the second memory space; and
   after the switching the target mapping relationship, the method further comprises:
   when code stored in the first memory space indicates that the second memory space needs to be accessed, sending, by the processing unit, a second access request to the memory control unit, wherein the second access request includes the second virtual address;
   receiving, by the processing unit, second exception information sent by the memory control unit, when the memory control unit determines that the access rule of the second physical address in the target mapping relationship is access forbidden;
   monitoring, by the processing unit, the first process based on the second exception information;
   switching, by the processing unit, the target mapping relationship to switch the target mapping relationship from the second mapping relationship to the first mapping relationship; and
   re-sending, by the processing unit, the second access request to the memory control unit.

3. The method according to claim 2, wherein the determining, by the processing unit, the first mapping relationship and the second mapping relationship comprises:

when the first process is created, determining, by the processing unit, a second process, wherein the second process is a parent process of the first process; and when the second process needs to be monitored, determining, by the processing unit, access rules of the second physical address in the first mapping relationship and the second mapping relationship.

4. The method according to claim 1, wherein the method further comprises:

when the first process ends, deleting, by the processing unit, the first mapping relationship and the second mapping relationship.

5. The method according to claim 2, wherein the method further comprises:

when the first process ends, deleting, by the processing unit, the first mapping relationship and the second mapping relationship.

6. The method according to claim 3, wherein the method further comprises:

when the first process ends, deleting, by the processing unit, the first mapping relationship and the second mapping relationship.

7. The method according to claim 1, wherein the first memory space is used to store code of an external function, the external function comprises a function other than a process function, and the process function is a function comprised in the program code for generating the first process.

8. The method according to claim 7, wherein the code of the external function comprises at least one of process shared code or system kernel code.

9. The method according to claim 2, wherein the first memory space stores code of an external function, the external function comprises a function other than a process function, and the process function is a function comprised in the program code for generating the first process.

10. The method according to claim 9, wherein the code of the external function comprises at least one of process shared code or system kernel code.

11. The method according to claim 3, wherein the first memory space stores code of an external function, the external function comprises a function other than a process function, and the process function is a function comprised in the program code for generating the first process.

12. The method according to claim 11, wherein the code of the external function comprises at least one of process shared code or system kernel code.

13. A non-transitory computer-readable storage media storing a computer instructions, that when executed by a processing unit in the computer device, cause the processing unit to perform the steps of:

determining a first mapping relationship and a second mapping relationship, wherein the first mapping relationship indicates a mapping relationship between a first virtual address and a first physical address and the second mapping relationship also indicates a mapping relationship between the first virtual address and the first physical address, and the first mapping relationship and the second mapping relationship both indicate an access rule of the first physical address, wherein the first mapping relationship indicates that the access rule of the first physical address is access forbidden, and the second mapping relationship indicates that the access rule of the first physical address is access allowed, wherein the first physical address is a physical address of a first memory space in the memory, and the first memory space is different from a second memory space in the memory, and wherein the second memory space is memory space used to store program code for generating a first process;

when the first process starts to run, determining that a target mapping relationship is the first mapping relationship, wherein the target mapping relationship is used when a memory control unit in the computer device controls access to the memory;

when the first process needs to access the first memory space, sending a first access request to the memory control unit, wherein the first access request includes the first virtual address;

receiving first exception information sent by the memory control unit, wherein the first exception information is sent when the memory control unit determines that the access rule of the first physical address in the target mapping relationship is access forbidden;

monitoring the first process based on the first exception information;

switching the target mapping relationship to switch the target mapping relationship from the first mapping relationship to the second mapping relationship; and re-sending the first access request to the memory control unit.

* * * * *